US009483934B2

(12) United States Patent
Kotlicki

(10) Patent No.: US 9,483,934 B2
(45) Date of Patent: Nov. 1, 2016

(54) PRESENCE BASED SYSTEM AND METHOD FOR CONTROLLING DEVICES

(71) Applicant: Oren Kotlicki, Ramat HaSharon (IL)

(72) Inventor: Oren Kotlicki, Ramat HaSharon (IL)

( * ) Notice: Subject to any disclaimer, the term of this patent is extended or adjusted under 35 U.S.C. 154(b) by 159 days.

(21) Appl. No.: 14/140,557

(22) Filed: Dec. 26, 2013

(65) Prior Publication Data

US 2014/0176310 A1 Jun. 26, 2014

Related U.S. Application Data

(60) Provisional application No. 61/745,826, filed on Dec. 26, 2012, provisional application No. 61/754,582, filed on Jan. 20, 2013.

(51) Int. Cl.
*G05B 11/01* (2006.01)
*G08C 17/02* (2006.01)

(52) U.S. Cl.
CPC .................................... *G08C 17/02* (2013.01)

(58) Field of Classification Search
None
See application file for complete search history.

(56) References Cited

U.S. PATENT DOCUMENTS

2008/0180228 A1* 7/2008 Wakefield ............. G01S 5/0252 340/4.62
2009/0080348 A1* 3/2009 Hamel et al. ................ 370/310
2009/0201169 A1* 8/2009 d'Hont et al. ........... 340/825.49
2011/0309933 A1* 12/2011 Marino .................... 340/539.32
2012/0022348 A1* 1/2012 Droitcour et al. ............ 600/323
2013/0099927 A1* 4/2013 Kulinets et al. ........... 340/572.1

* cited by examiner

*Primary Examiner* — Brian Zimmerman
*Assistant Examiner* — Thomas McCormack
(74) *Attorney, Agent, or Firm* — Pearl Cohen Zedek Latzer Baratz LLP

(57) ABSTRACT

System and method for presence based control of connected devices including a smart device configured to operate at least one connected device, and a locator configured to supervise an entrance of a subarea of a monitored area, wherein the smart device and the locator are configured to exchange radio frequency (RF) signals and to determine the presence of the smart device within the subarea based on received RF signals, and wherein the smart device to issue control commands to operate the at least one connected device based on a predefined scheme and on the presence of the smart device within the subarea.

45 Claims, 5 Drawing Sheets

PRESENCE BASED SYSTEM AND METHOD FOR CONTROLLING DEVICES

CROSS REFERENCE TO RELATED APPLICATIONS

This application claims the benefit of U.S. Ser. No. 61/745,826, filed on Dec. 26, 2012 and entitled "Smart-device as presence based smart home controller", and U.S. Ser. No. 61/754,582 filed on Jan. 20, 2013 and entitled "Smart-device as location based smart home controller", which are incorporated in their entirety herein by reference.

BACKGROUND OF THE INVENTION

Smart home, connected home, digital home, intelligent home and digital life are some of the names for value added solutions, products and services that provide users with the ability to use smart devices such as smart phones, smart watches, tablets, smart televisions, computers, etc., to remotely and locally control, manage and get notifications from connected devices such as security systems, lights, heaters, air conditioners, door locks and other appliances.

By using a smart home service, users can remotely change the security system mode of operation, turn connected devices (e.g. lights) on and off, change heater or air conditioner target temperature setting, get appliance excess energy usage notifications as text or email messages, get security system event notifications as text or email messages, set rules so that connected devices would change their state as a result of an event (time, date, other appliance state change), etc.

Typical smart home systems usually include a back end server system. The back end system typically communicates over the internet with a user's remote I/O interface terminal (whether mobile or stationary) and with a dedicated home controller which is the control point in the user's premises. The home controller communicates with the various connected devices, enabling the owner to control and get notifications from these devices. In addition, the home controller or the back end system may include a device scheduler in order to execute device related scheduled commands, set by the owner in advance or otherwise. The system may include smart devices such as laptops, tablets, smart televisions, smart phones, etc., which may be used as an I/O interface to the user.

In this typical architecture, any communication between smart devices and connected devices must pass via the home controller and the back end system. Events from connected devices are forwarded to the user's smart devices via the home controller and the back end system, and control commands sent from the user's smart devices are forwarded by the back end system to the home controller for execution.

The typical smart home solution architecture as described above provides only manual control of the connected-devices. Users can either control the connected-devices by sending an on-demand command or, at most, create a scheduler rule that changes the connected-devices state as a result of certain events such as time, date, another connected-device state change, etc.

Known wireless locators typically use a combination of two wireless technologies such as radio frequency identification (RFID) and Infra-Red, to identify presence of an object in a specific room or area or space of interest. A typical indoors real time location service (RTLS) incorporates deployment of wireless locators that wirelessly communicate with an object within their wireless range for the purpose of positioning the object in a specific room or area. The wireless locators or the object then communicate with an RTLS server platform, acknowledging that the specific object is at the specific location. Due to the nature of RF signals, indoors RTLS wireless locators typically use Infra-Red technology in addition to RF communication to achieve the required level of positioning accuracy.

SUMMARY OF THE INVENTION

According to embodiments of the present invention, there is provided a presence based system. The system may include a smart device configured to operate at least one connected device, and a locator configured to supervise an entrance of a subarea of a monitored area, wherein the smart device and the locator may be configured to exchange radio frequency (RF) signals and to determine presence of the smart device within the subarea based on received RF signals, and wherein the smart device may issue control commands to operate the at least one connected device based on a predefined scheme and on the presence of the smart device within the subarea.

Furthermore, according to embodiments of the present invention, the smart device and the locator may determine the presence of the smart device within the subarea by detecting passing of the smart device through an entrance of the subarea.

Furthermore, according to embodiments of the present invention, the smart device and the locator may detect the passing of the smart device through the entrance based on received signal strength indicator (RSSI) of the received RF signals.

Furthermore, according to embodiments of the present invention, the smart device and the locator may detect the passing of the smart device through the entrance if the RSSI of the received RF signals is above a predefined threshold.

Furthermore, according to embodiments of the present invention, the predefined threshold may be customized to the smart device and the locator.

Furthermore, according to embodiments of the present invention, the RF signals may be transmitted by the smart device and received by the locator or transmitted by the locator and received by the smart device.

Furthermore, according to embodiments of the present invention, the smart device may determine the presence of the smart device within the subarea based on the received RF signals.

Furthermore, according to embodiments of the present invention, the locator may determine the presence of the smart device within the subarea based on the received RF signals, and wherein the locator may inform the smart device of the presence of the smart device within the subarea.

Furthermore, according to embodiments of the present invention, the locator may include a directional antenna.

Furthermore, according to embodiments of the present invention, the beam width of the directional antenna may be less than 45 degrees.

Furthermore, according to embodiments of the present invention, the system may include an additional locator, the additional locator may supervise the entrance, and the smart device and the locators may distinguish between entrance into and exit from the subarea of the smart device based on the sequence of RSSI of RF signals exchanged between each of the locators and the smart device.

Furthermore, according to embodiments of the present invention, the system may include at least one additional smart device, wherein each of the smart devices has a user priority rank associated to it, and wherein the smart device to control the at least one controlled device based on the presence of the at least one additional smart device and based on the user priority ranks.

Furthermore, according to embodiments of the present invention, the smart device may control the at least one connected device using direct wireless communication between the smart device and the at least one connected device.

Furthermore, according to embodiments of the present invention, the system may include a transparent wireless bridge device to connect between the smart device and the at least one connected device, wherein the smart device may control the at least one connected device through the transparent wireless bridge device.

According to embodiments of the present invention, there is provided a smart device configured to control at least one connected device, wherein the smart device may determine, using a locator configured to supervise an entrance of a subarea of a monitored area, presence of the smart device in the subarea, wherein the presence may be determined based on strength of received RF signals exchanged between the smart device and the locator, and wherein the smart device may control the at least one connected device based on the presence of the smart device within the subarea and on a predefined scheme stored in the smart device.

Furthermore, according to embodiments of the present invention, the smart device may produce the RF signals and determine the presence based on received indications from the locator of passing of the smart device through the entrance.

Furthermore, according to embodiments of the present invention, the smart device may determine the presence of the smart device within the subarea by detecting passing of the smart device through the entrance.

Furthermore, according to embodiments of the present invention, the smart device may receive the RF signals from the locator and to determine the passing of the smart device through the entrance, based on the received RF signals.

Furthermore, according to embodiments of the present invention, the passing of the smart device through the entrance may be determined if RSSI of the received RF signals is above a predefined threshold.

Furthermore, according to embodiments of the present invention, the predefined threshold may be customized to the smart device and the locator.

Furthermore, according to embodiments of the present invention, the smart device may include a user priority rank, wherein the smart device may obtain indications of presence of other smart devices in the same subarea, and may obtain user priority ranks associated with the other smart devices, and wherein the smart device may control the at least one connected device based on the user priority rank of the smart device and on the user priority ranks associated with the other smart devices.

Furthermore, according to embodiments of the present invention, the smart device may include an antenna, wherein the antenna may be used for the exchanging of the RF signals between the smart device and for data or voice communication.

Furthermore, according to embodiments of the present invention, the smart device may control the at least one connected device using direct wireless communication between the smart device and the at least one connected device.

According to embodiments of the present invention there is provided a method for controlling at least one connected device by a smart device, the method may include determining presence of the smart device in a subarea of a monitored area, wherein the presence may be determined based on strength of RF signals exchanged between the smart device and a locator configured to supervise an entrance of the subarea, controlling the at least one connected device by the smart device based on a predefined scheme stored in the smart device and on the presence of the smart device within the subarea.

Furthermore, according to embodiments of the present invention, determining the presence may include detecting passing of the smart device through the entrance.

Furthermore, according to embodiments of the present invention, passing may be detected if RSSI of the RF signals is above a predetermined threshold.

Furthermore, according to embodiments of the present invention, the method may include customizing the predetermined threshold to the smart device and the locator.

Furthermore, according to embodiments of the present invention, the method may include producing the RF signals by the smart device, receiving the RF signals by the locator, and receiving from the locator indications of the passing of the smart device through the entrance of the subarea associated with the locator.

Furthermore, according to embodiments of the present invention, the method may include producing the RF signals by the locator, receiving at the smart device RF signals produced by the locator, and determining the passing of the smart device through the entrance, based on the received RF signals.

Furthermore, according to embodiments of the present invention, the method may include assigning a user priority rank to the smart device, receiving at the smart device indications of presence of other smart devices in the same subarea, each of the other smart devices having an associated user priority rank, and controlling the at least one connected device based on the user priority rank of the smart device and on the user priority ranks of the other smart devices.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
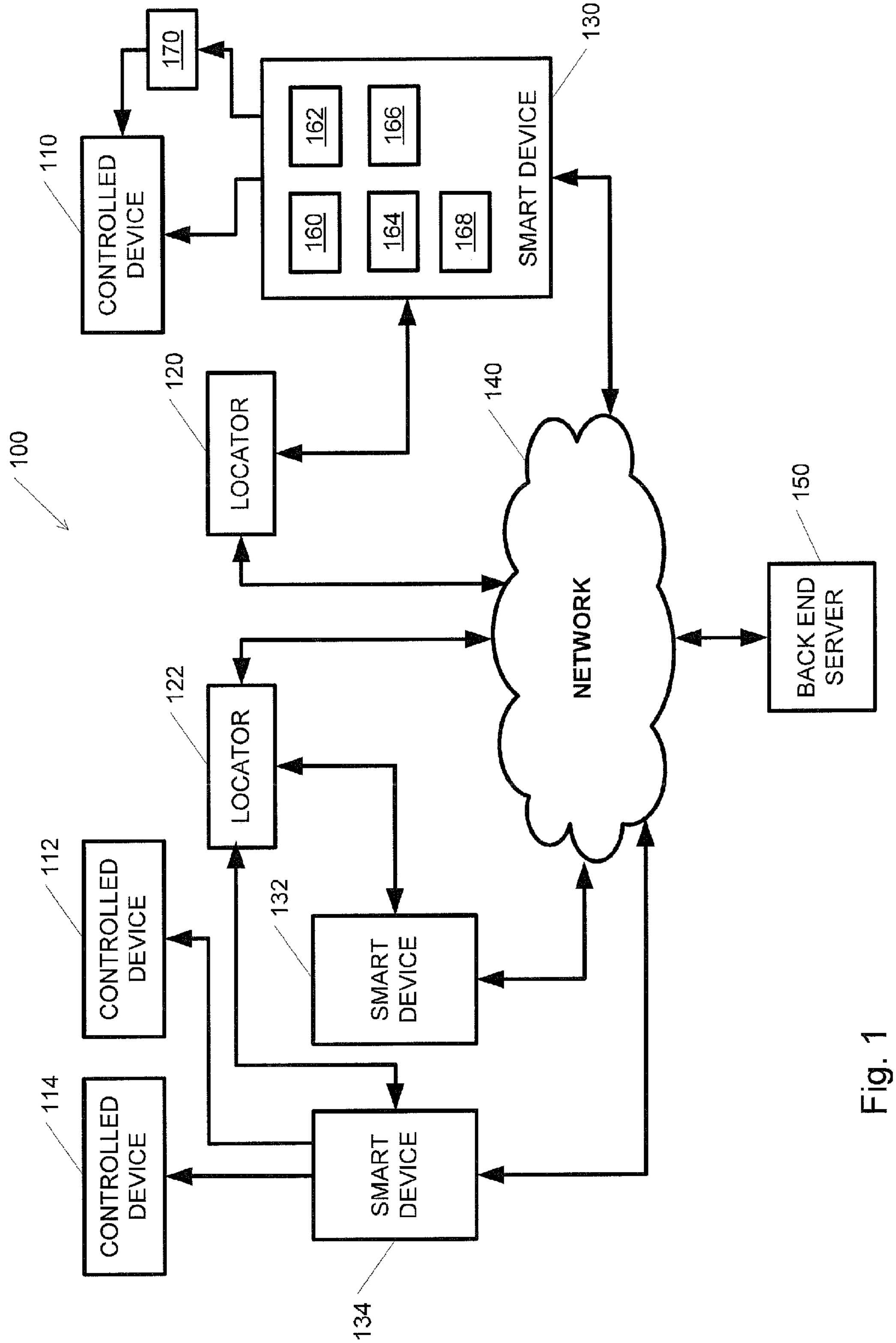
FIG. 1 is schematic diagram illustrating an exemplary presence based system according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the present invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other non-transitory information storage medium that may store instructions to perform operations and/or processes.

Although embodiments of the present invention are not limited in this regard, the terms "plurality" and "a plurality" as used herein may include, for example, "multiple" or "two or more". The teens "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

According to embodiments of the present invention, a smart device may be configured as a presence based controller. The smart device may know in which subarea of a monitored area it is present and may operate a plurality of connected devices located in the same subarea, or in other monitored subareas, based on a predefined scheme stored on the smart device, and further based on the presence of the smart device within the subarea. As used herein subarea may refer to a predefined area within a monitored area. The area may include a room of a building, a plurality of rooms, a part of a big room etc., as may be determined by the system designer. Each subarea may include an entrance, through which a user must pass in order to enter or leave the subarea. For example, if the subarea is a room, the entrance may be defined as the doorway. It will be noted that according to embodiments of the present invention the entrance of a subarea should not necessarily be a physical entrance, such as a doorway. The entrance may be a path along which a user may walk (or roll, in the case of a wheelchair) or the like, on which a predefined line symbolizes the border between two subareas and that when it is crossed the user may be recognized as leaving one subarea and/or entering another subarea.

Some current smart home solutions may include location or presence based controlling features. According to these solutions, a user may be detected, using various techniques, to be present in a specific area or to be in proximity to a connected device. Current smart home solutions typically detect the presence of some user, but do not identify the user. Once a user is detected, connected devices may react by either using a built-in controller or scheduler that was pre-configured with commands to be executed once a user's proximity presence is detected, or the connected devices may obtain commands from a dedicated central controller with which the connected devices can communicate. According to embodiments of the present invention, however, the smart device is not only used for presence and identification recognition, but also as a controller. Thus, once the smart device identifies the subarea in which it is present, the smart device itself may control the connected devices. The smart device may communicate directly with connected devices at the same subarea, or in other areas at a control reach, for the purpose of execution of user and presence related commands. The smart device may communicate indirectly with connected devices that are out or reach via other smart devices as will be described herein. These commands are neither pre-programmed on the connected device, nor are they retrieved from another central controller. These commands may be stored on the smart device, allowing dynamic scheduler command updates without the need of programming connected devices or dedicated controller.

Furthermore, embodiments of the present invention allow for personalization and customization of control of the connected devices. Current smart home solutions lack the ability to identify a specific user, and to determine the presence of a specific user in a specific subarea. Therefore, solutions known in the art cannot personalize the control of the connected devices. According to embodiments of the present invention, however, a smart device of a specific user may include commands and control schemes that are customized according to the preferences of that specific user, and according to the user's priority over other users admitted in that subarea or monitored area. Thus, when the smart device of the user knows in which subarea it is located, the smart device may control the connected devices that are related to that subarea or connected devices in a subarea where the user was present and left before entering the current subarea, according to the preferences of the specific user, as programmed on the smart device of the user. Embodiments of the present invention also provide mechanisms to prioritize users when more than one user is present in a respective area or subarea.

According to embodiments of the present invention, the smart device may use the same hardware that is widely used for data or voice communication, also for RF transmission or reception for the purpose of presence detection and determination. For example, the smart device may use the same antenna used for Bluetooth or Wi-Fi communication for exchanging RF signals with locators for the purpose of presence detection, and use the same hardware for data or voice communication with the locators and with connected devices using Bluetooth or Wi-Fi protocols.

Reference is made to FIG. 1 which is a schematic diagram illustrating an exemplary presence based system 100 according to embodiments of the present invention. According to embodiments of the present invention, system 100 may include smart devices 130, 132, 134 that may communicate via network 140, wireless locators 120, 122 and connected devices 110, 112, 114. System 100 may optionally include back end server 150.

Smart devices 130, 132, 134 may be any portable, typically handheld computing devices such as laptops, tablets, notebook computers, smart phones, smart watches, smart glasses etc. The following description will relate to a single smart device 130. However, other smart devices 132, 134 of system 100 may include similar components and capabilities and the following discussion equally applies to all smart devices 130, 132 and 134 of system 100. Smart device 130 may include short range radio frequency (RF) wireless communication module 160 for short range RF wireless communication using protocols such as Bluetooth, Wi-Fi or similar for communication with connected devices, locators, other smart devices and the network router (gateway). Additionally or alternatively, smart device 130 may include a non-RF short range wireless communication module 162 for non-RF communication with connected devices 110, 112, 114. Non-RF short range wireless communication module 162 may include any of optical, acoustic or any other non-RF communication modules. Smart device 130 may include long range RF wireless communication module 164, such as cellular, or similar communication module for communicating with each other, with service back end server 150 and with any other component of system 100, as may be required.

Smart device 130 may include processor 166 and memory unit 168. Processor 166 may be configured to execute commands included in a program, algorithm or code stored in memory 168. Processor 166 may include components such as, but not limited to, one or more central processing units (CPU) or any other suitable multi-purpose or specific processors or controllers, one or more input units, one or more output units or any other suitable hardware components and/or software components. Processor 166 may be any computation device that is configured to execute various operations included in some methods disclosed herein. Memory 168 may be a non-transitory computer-readable storage medium that may store thereon instructions that when executed by processor 166, cause processor 166 to perform operations and/or methods, for example, the method disclosed herein. The instructions stored on memory 168 may include, for example, presence based controller software application.

According to some embodiments of the present invention, smart device controller application, once activated, may activate smart device 130 as a presence based controller. The smart device controller application may be a pre-installed application, user-downloadable application, a service provider pushed application or any other type of application that is adapted to load and run on smart device 130. A detailed description of an exemplary high level design of the smart device controller application will be given hereinbelow. It should be readily understood by those skilled in the art that the specific implementation described hereinbelow is exemplary only and that other software architecture and modules may be used to carry out methods according to embodiments of the present invention, disclosed herein. The exemplary presence based controller application may include a wireless manager, a database sub-module, a database management sub-module a scheduler sub-module, a user interface sub-module, an alert sub-module and a back end server communicator.

The wireless manager may handle wireless communications of smart device 130. The wireless manager sub-modules may include but not limited to a device manager sub-module and communication manager sub-module.

The device manager sub-module may handle a device database including information regarding other devices of system 100 that smart device 130 may communicate with and control, such as wireless locators 120, 122 and connected devices 110, 112, 114 (referred to hereinbelow as devices). Device manager sub-module may add, modify and delete devices from the database. Each entry of the database may include the following parameters for each device:

Device media access control (MAC) address—The MAC address of the device.

Device communication method—which may define the communication method with the device (Bluetooth, Wi-Fi, Etc.)

Device address—device internet protocol (IP) address or network address.

Device type—which indicates the type of the device, e.g., whether it is a locator 120, 122 or a connected device 110, 112, 114, etc. The device type parameter may also indicate the type of the connected device e.g., is it light, thermostat, lock, etc. and the type of the locator e.g., does it include a single or two antennas.

Device name—may include a user friendly and optionally user definable name to describe the device.

Device location—may give indication of the location of the device in the monitored area, e.g., the subarea in which the device is located and/or the subarea associated with presence indication issued/transmitted by the device in case the device is a locator.

Device pairing code—a parameter that may be used for authentication in some of the wireless communication technologies such as Bluetooth.

Authorization—a parameter allowing the user to define whether authorization by the user of the smart device is needed prior to command execution. Authorization may be the device code as well as any alternative way of implementing user authorization. If authorization is required, the user may be required by the smart device to enter a code to allow the smart device to send commands to connected devices.

The communication manager sub-module may handle communication with wireless locators 120, 122 and with connected devices 110, 112, 114. The communication manager sub-module may utilize any of the communication modules of smart device 130, e.g., short range wireless communication module 160 and/or long range RF wireless communication module 164, in order to communicate with wireless locators 120, 122 and connected-devices 110, 112, 114.

The database sub-module may store data required for the operation of smart device 130 as a location based controller. The data may include an identification number (ID) of smart device 130 and the present location of smart device 130. Additionally, the data may relate to wireless locators 120, 122, as well as presence based and manual commands of connected-devices 110, 112, 114. The database sub-module may include the following exemplary data items and capabilities:

Smart devices database—which may include a list of all other smart devices that are registered with system 100, their user priority rank, and if present in the monitored area at a given time, the current subarea they are present in, etc.

Connected device database—may include a list of all supported connected devices, such as connected devices 110, 112, 114, their identifiers, control protocol, etc.

The controller application may not recognize a connected device unless it is listed in the connected device database.

Locator database—may include a list of the registered locators 120, 122. For each registered locator, the locator database may include an ID, information describing the location of the locator, and presence timer for providing an indication of the amount of time the smart devices has been present in a subarea. According to some embodiments of the present invention, the list of registered locators may include all the locators of the monitored area, or a subset of locators of the monitored area. For example, if a smart device is not authorized to ever control connected devices in certain subarea, locators of this subarea may not be listed in the list of registered locators. In this way, the smart device will not communicate with these locators and may not be identified as present in this subarea, and hence may not be able to control connected devices in this subarea. It should be noted that a smart device of system 100 may be authorized to control connected devices in some subareas and not authorized to control connected devices in other subareas in other ways. For example, the smart device may be preprogrammed to not send commends to connected devices in certain subareas, even if the smart device is detected as present within these subareas. The presence timer may be used for prioritizing among a plurality of smart devices that are present in the same location at the same time, as will be discussed herein.

Scheduler database—may include user specific scheduler commands, the commands may include the commands action to be carried out and the triggering conditions.

User priority rank of the smart device—The user priority rank may be used to determine which of a plurality of smart devices that are present at the same subarea at the same time would control the connected devices of that subarea. A smart device that may control the connected devices of a certain subarea at a certain period of time may be referred to herein as a master smart device for that subarea at that period of time. For example, the user priority rank may be used by a multi user conflict resolution engine executable by a connected device to prioritize between multiple commands received at the connected device from a plurality of smart devices of system 100. User priority rank may be used by the connected device for user prioritization of command execution, as disclosed herein. Alternatively, the user priority rank may be used by smart devices of system 100 that are present in the same subarea at the same time to prioritize themselves, as will be discussed elsewhere. Embodiments of the present invention are not limited to a single user priority rank for each smart device. For example, smart device 130 may include a user rights system that includes different user priority ranks for different connected devices may be used to allow connected device specific prioritization between users.

The database management sub-module—may handle operations related to the database module and include the following capabilities:

Status and scheduler query mechanism—which may hold the conditions for invoking a query to a connected device for its status and may be used for storing the connected device status parameters as needed in the database. In addition, the query mechanism may send scheduled commands to connected devices. The exact method for data exchange between smart devices and connected devices is implementation specific and may vary between push, pull and any other mechanism as may be required or best suit specific design requirements.

Database update and synchronization mechanism—may be in charge of synchronizing the database between the smart device and back end server 150.

The scheduler sub-module may include scheduler triggers that are based on the presence of smart device 130 in a subarea, as well as on the time of day, the day in the week, the date, events of connected devices, temperature indicator reading, etc. Additionally, scheduler triggers may be based on presence of other smart devices together with the user's smart device in the subarea at the same time.

The user interface sub module may provide graphical user interface (GUI), textual interface or a combination thereof that may typically allow for receiving instructions from and displaying notifications to the user of smart device 130. The user interface may provide interface for the user to operate the device manager functions as described above, execute manual command on connected devices, configure the presence based scheduler of smart device 130, etc. The user interface sub module may be configured to receive user instructions and provide information to the user in any applicable manner, including giving and receiving oral messages.

The alert sub-module may give notifications to the user when the application runs in the background.

The back end server communicator may communicate with optional back end server 150. Exchanged information between the back end server communicator and the back end server 150 may include, but is not limited to, scheduler database updates, current location updates, user priority updates, remote commands, events and alerts.

According to embodiments of the present invention, the smart device controller software application may take advantage of existing hardware and/or software components of smart device 130 such as a graphical screen, keypad, touch technology, wireless interfaces (Bluetooth, Near Field Communication (NFC), Wi-Fi, etc.) and others in order to convert a smart device 130 into a controller capable of communicating with and controlling connected devices 110, 112, 114. The term existing hardware components refers to components that current smart devices typically include. Thus, it may not be required to add or modify the hardware of smart device 130 in order to turn it into a presence based controller according to embodiments of the present invention. Smart device 130 may either communicate with connected devices 110, 112, 114 directly, or via an external wireless bridge device 170 that may connect between the communication interface of connected device 110, 112, 114 and smart device 130, and may be transparent to smart device 130. For example, current smart devices typically include Bluetooth and Wi-Fi communication modules. These communication modules may be used by the smart device in order to communicate with commented devices 110, 112, 114 and with locators 120, 122.

Locators 120, 122 may be placed in a location supervising an entrance of a subarea of a monitored area, and be configured to give indication of presence of smart devices 130 132, 134 within a subarea. More precisely, locators 120, 122 may help detecting that a smart device has passed through an entrance of a subarea. Thus, they may determine or aid in determining that a smart device has entered or exited a subarea. The following description will relate to a single locator 120. However, it should be readily understood that other locators of system 100, such as locator 122, may include similar components and capabilities and the following discussion equally applies to all locators 120, 122 of system 100.

One of the crucial features of the presence based controller according to embodiments of the present invention, is the ability of smart device 130 to identify the subarea in which smart device 130 is present, as precisely as possible. If the presence of smart device 130 is not accurately detected, undesirable result may be that smart device 130 may control connected devices located in other subareas instead of connected devices that are located in the same area as smart device 130, or may fail to control connected device located in the same subarea where it is located.

Locator 120 may be located so as to supervise the entrance of a subarea and may be configured to detect, or help smart device 130 to detect that smart device 130 has passed through the entrance, e.g., entered or exited the subarea. Locator 120 may include a single RF wireless unit and one, two or more directional antennas, or antennas providing directional patterns. For example, a phase array of non-directional antennas may be used to create directional patterns. Positioning issues of locators will be discussed with reference to FIGS. 5A-D. According to some embodiments of the present invention, locator 120 may exchange RF signals with smart device 130. Thus, passing, e.g., entrance or exit, of smart device 130 through the entrance that locator 120 is supervising into or out of the supervised subarea and hence presence of smart device 130, may be detected based on those RF signals. Passing of smart device 130 through the entrance locator 120 is supervising may be detected based on received signal strength indicator (RSSI) of the RF signals exchanged between locator 120 and smart device 130. For example, passing of smart device 130 through the entrance locator 120 is supervising may be detected if RSSI of the RE signals are above a predetermined threshold. The predetermined threshold may be customized to smart device 130 and locator 122. There may be different thresholds for different pairs of smart devices and locators. As will be discussed hereinbelow, either locator 120 or smart device 130 may act as a transmitter or a as a receiver of RF signals for the purpose of determining the subarea in which smart device 130 is present. Various signal processing methods such as low pass filtering, e.g., moving average, may be implemented to reduce noise of the detected RF signals. In addition to the exchange of RF signals for the detection of passing of smart device 130 through the entrance, locator 120 and smart device 130 may further communicate using RF signals, for example, using Bluetooth or Wi-Fi protocols, to exchange information as may be required, for example, for mutual identification. As mentioned herein, the same hardware may be used for presence detection and for data or voice communication.

In case smart device 130 is the transmitter and locator 120 is the receiver, smart device 130 may be configured to transmit RF signals and locator 120 may be configured to receive the RF signals transmitted by smart device 130. Smart device 130 may be configured to transmit the RF signals continuously or intermittently at predetermined intervals. The presence of smart device 130 in a subarea, or the termination of the presence, may be concluded based on detecting of passing of smart device 130 through the entrance locator 120 is supervising. Passing of smart device 130 through the entrance locator 120 is supervising may be detected based on received signal strength indicator (RSSI) of the RF signals transmitted by smart device 130 and received by locator 120. For example, passing of smart device 130 through the entrance locator 120 is supervising may be detected if RSSI of the RF signals transmitted by smart device 130 and received by locator 120 are above a predetermined threshold. Locator 120 may send notification to smart device 130 indicating the received RSSI level, or that the received RSSI level is above a predefined level and in response smart device 130 may conclude that it has passed through the entrance locator 120 is supervising.

Similarly, in case smart device 130 is the receiver and locator 120 is the transmitter, locator 120 may be configured to transmit RF signals and smart device 130 may be configured to receive the RF signals transmitted by locator 120. Locator 120 may be configured to transmit the RF signals continuously or intermittently at predetermined intervals. Smart device 130 may conclude the presence, or the termination of the presence, of smart device 130 within a subarea of locator 120 by detecting passing of smart device 130 through the entrance locator 120 is supervising. Passing of smart device 130 through the entrance locator 120 is supervising may be concluded based on received signal strength indicator (RSSI) of the RF signals transmitted by locator 120 and received by smart device 130. For example, passing of smart device 130 through the entrance locator 120 is supervising of smart device 130 may be concluded if RSSI of the RF signals transmitted by locator 120 and received by smart device 130 are above a predetermined threshold.

According to embodiments of the present invention, presence detection capabilities may be enhanced by using more than one locator 120, 122. For example, since RF signals may penetrate through walls and travel between adjacent areas, and since adjacent areas such as rooms of a single house, and especially entrances to these rooms, may be physically close, RF signals exchanged between both locators 120, 122 and smart device 130 may both be above the threshold.

For example, if locators 120, 122 are the receivers, locators 120, 122 located in two different subareas may receive RF signals with RSSI level above the threshold from smart device 130, that can only be present in one place at the same time. Similarly, if locators 120, 122 are the transmitters and smart device 130 is the receiver, smart device 130 may receive RF signals with RSSI level above the threshold from more than one locator. Thus, RSSI readings of more than one locator, or RSSI readings of RF signals received at smart device 130 from more than one locator 120, 122 may be used to determine the exact location of smart device 130. For example, the measured level of RSSI, or the degree at which the measured RSSI is above the threshold of a plurality of locators may be taken into account so that the correct location of smart device 130 may be determined.

The transmitter, which, as discussed hereinabove, may be either locator 120 or smart device 130, may transmit RF signals continuously or intermittently at predetermined intervals, for example, the transmitter may transmit bursts of RF signals of 125 msec, 3 times a second. The receiver, being either locator 120 or smart device 130, may be in receiving mode, for example, for at least enough time to allow three signal readings from the transmitter. The receiver may determine the presence of smart device 130 in any of the respective areas based on RSSI of the received transmissions. Other bursts length of RF signals and transmitting intervals are possible as well.

According to embodiments of the present invention, locator 120 may include a single directional antenna, supervising the entrance to a subarea. In this configuration locator 120 may detect passing of smart device 130 through the entrance of the subarea, however, it may be difficult to determine the direction of motion of smart device 130. Thus locator 120 may not be able to determine whether smart device 130 enters or exits the subarea, or just wondering around the subarea near locator 120. Thus, presence of smart device 130 may be determined based on readings of more than one locator using signal processing methods, as well as based on logical conclusion drawing scheme. For example, when smart device 130 is detected passing the entrance of locator 120 for the first time it may be determined that smart device 130 enters a subarea of locator 120. If, for example, smart device 130 is detected passing by locator 120 for the second time in a predetermined time interval, it may be determined that smart device 130 has left the first subarea. However, a second detection may be related to movements of the smart device within the subarea of locator 120 and not necessarily to passing by the entrance. However, if after smart device 130 is detected passing by locator 120 the same smart device is detected passing by locator 122, it may be determined that smart device 130 has left the subarea of locator 120 and entered a subarea of locator 122. If smart device 130 is out of range of all locators 120, 122 of system 100, it may be determined that smart device 130 has left the monitored area of system 100. Such logical conclusion drawing scheme may also require communication between locators 120, 122 or between smart device 130 and locators 120, 122 or back end server 150 to consider information of more than one locator.

According to embodiments of the present invention, locator 120 may include two or more directional antennas, each directed to a different direction along the expected walking route of the user when the user enters or exits the subarea of locator 120. For example, each of the two or more directional antennas may be directed to a different direction along a line substantially perpendicular to the plane of the entrance locator 120 is supervising. This is analogues to having two locators along the expected walking route of the user when the user enters or exits the subarea of locator 120. In this configuration, the direction of motion of smart device 130 within the range of the two antennas may be determined based on the sequence of the RSSI of the RF signals produced by the transmitter (e.g., locator 120 or smart device 130) and detected by the receiver (e.g., smart device 130 or locator 120).

According to embodiments of the present invention, smart device 130 may take action, e.g., operate and control connected devices when entering or leaving a subarea, or when present inside a subarea, as disclosed herein. Smart device may control connected devices directly by sending commands that are stored in the smart device to the connected device using direct wireless communication between the smart device and the at least one connected device. If necessary, wireless bridge device 170 may be used to connect between the smart device and the connected device.

According to embodiments of the present invention, locators 120, 122 may determine the presence of unknown smart devices. Unknown smart devices may refer to smart devices that are not registered with system 100 and cannot operate as presence based controllers of system 100. For example, either locators 120, 122 or back end server 150, or both may store a list of known smart devices. If locators 120, 122 act as receivers for the purpose of determining presence of smart devices, locators 120, 122 may receive RF signals form smart devices that are not listed in the database of known smart devices. Locators 120, 122 may inform other components of system 100, for example, smart device 130 of the presence of the unknown smart device in the same subarea. Smart device 130 may be pre-programmed to consider the presence of the unknown smart device, for example to change the control scheme of smart device 130 when smart device 130 is notified of the unknown smart device.

Connected devices 110, 112, 114 may include appliances with specific integrated hardware and software, or an add-on module to existing appliances, that converts them to controllable appliances capable of communicating with smart device 130. Connected devices 110, 112, 114 may receive commands from smart device 130 and operate upon these commands. Connected devices 110, 112, 114 may include the following capabilities (built-in or as an add-on):

- Transmission in short and/or long range RF wireless technology (Bluetooth, NFC, Wi-Fi, Zigbee, Z-wave or similar) and/or Non-RF wireless technology (optical, acoustic etc.) compatible with the corresponding short and/or long range communication technology of the smart device 130 to allow presence based communication (preferably two-way communication) with smart device 130.
- Be equipped with command execution engine that may enable connected devices 110, 112, 114 to process and execute commands received from smart device 130.
- Be equipped with communication manager capable of initiating, responding and establishing short and/or long range communications with smart device 130.

System 100 may include back end server 150, however, back end server 150 is optional and not obligatory for the smooth operation of system 100, since smart devices 130, 132 and 134 may determine their location and operate as controllers using direct communication between themselves, with locators 120, 122 and connected devices 110, 112, 114. Back end server 150 may be located in the same physical location of system 100 and communicate with other components of system 100 over a private or dedicated network, e.g. local area network (LAN) or virtual local area network (VLAN), using short range wired or wireless communication protocol such as Wi-Fi. Back end server 150 may be located at a distant location and communicate with components of system 100 over a wide area network such as the Internet, as known in the art. Back end server 150 may enhance the performance of system 100 by providing the following capabilities:

Out of range control of connected devices 110, 112, 114—back end server 150 may enable smart device 130 to remotely control connected devices 110, 112, 114 that are out of range from smart device 130 but in range of other smart devices of system 100. This is accomplished by using back end server 150 as a communication path between smart device 130 and smart devices 132, 134, enabling smart device 130 to be informed which of connected devices 110, 112, 114 is in range of smart devices 132, 134 and to send remote commands to remote connected devices via back end server 150 and smart devices that are in range of the desired connected devices.

Account management—back end server 150 may enable creation of accounts. For example, an account may include data regarding one or more smart devices 130, 132, 134.

Back end server 150 may include a user portal enabling users to register to the service (open an account) and register smart devices.

Data backup and synchronization—The back end server 150 may synchronize smart devices 130, 132, 134. For example, back end server 150 may unify and distribute among smart devices 130, 132, 134 data related to connected devices 110, 112, 114 and locators 120, 122. In addition, back end server 150 may store a copy of databases of smart devices 130, 132, 134 for backup. Elimination of the need to pair connected devices 110, 112, 114 to each of the account smart devices 130, 132, 134 separately. For example, back end server 150 may distribute among smart devices 130, 132, 134 data related to connected devices 110, 112, 114 such as name, location, pairing code, authorization need, etc. For example, back end server 150 may distribute to smart device 130 data related to other smart devices of system 100 such as user priority rank, location, etc. Back end server 150 may enable configuration of various components of system 100, such as locators 120, 122, smart devices 130, 132, 134 and connected devices 110, 112, 114, directly through back end server 150, via input means of back end server 150, or over the Internet using a hosted web portal.

Event notification engine—may obtain and send events from and to smart devices 130, 132, 134 and according to user definition of required event notifications per smart device. An event may relate any status update received by a smart device that may have to be distributed to other smart devices of system 100. Events may include status changes of connected devices, error messages related to a remote command operation sent by a remote smart device to be executed by another smart device but cannot be executed due various reasons, etc.

Smart devices 130, 132, 134 may communicate with back end server 150 to synchronize user data and scheduler data. For example, such communication may be established if a smart device has changed presence related scheduler data on either the back end server 150 or on the smart device application. Other data of system 100 may be synchronized as well, including registration or removal of a smart device or connected device from system 100. Communication between smart devices 130, 132, 134 and back end server 150 may also include commands and other information sent from other smart devices, for example, commands that are intended to connected devices that are in range of the receiving smart device but out of range for the sending smart device, status updates from connected devices, etc.

Figure 2:
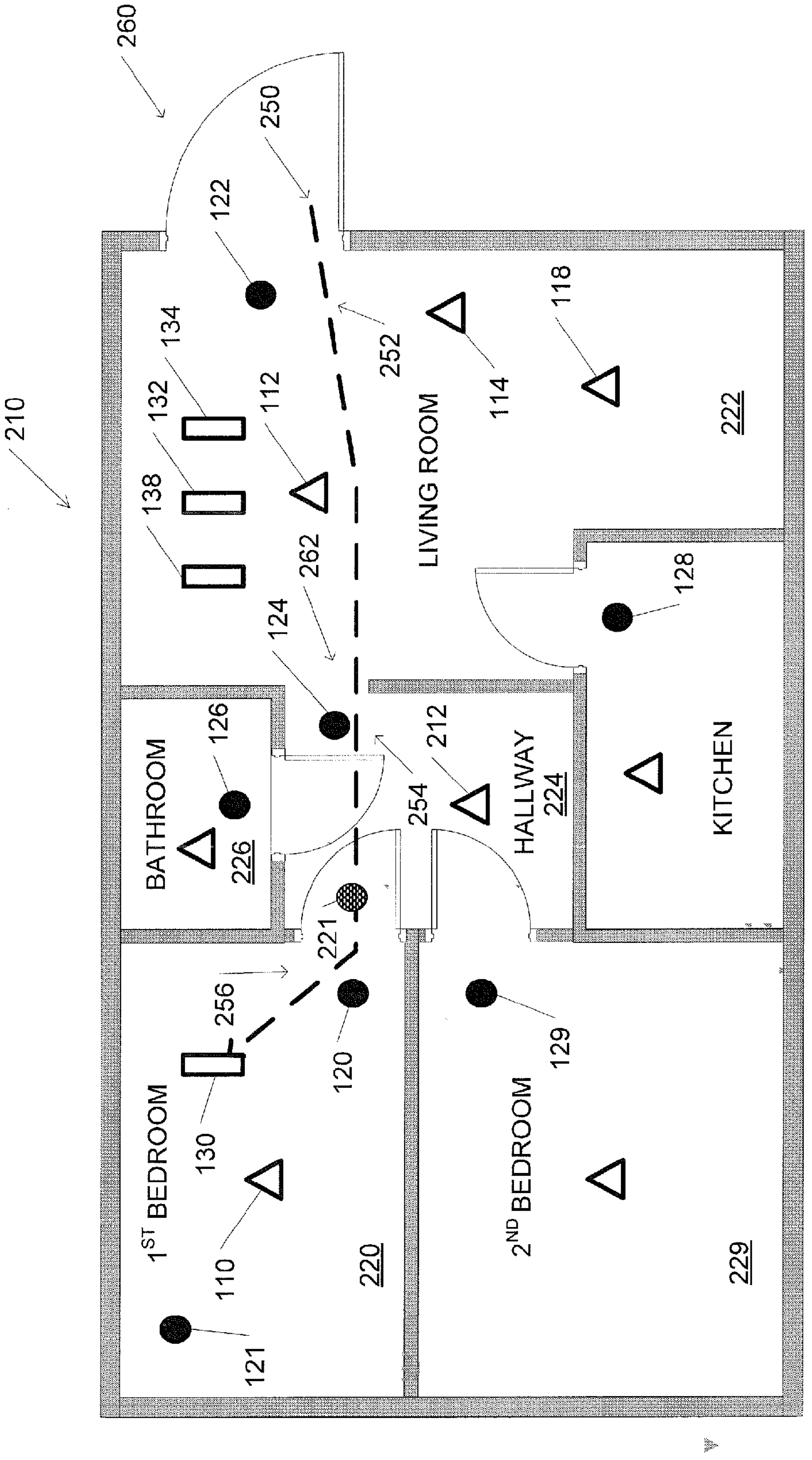
FIG. 2 is a high-level diagram of an exemplary presence based system according to embodiments of the present invention, such as the presence based system depicted in FIG. 1, installed in a residential apartment.

Reference is made to FIG. 2 which is a high-level diagram of an exemplary presence based system according to embodiments of the present invention, such as presence based system 100 depicted in FIG. 1, installed in a residential apartment. It is noted that embodiments of the present invention are not limited to smart home applications. Presence based systems according to embodiments of the present invention may be utilized in other sites such as hotels, offices, shops, hospitals etc.

Monitored area 210 depicted in FIG. 2 includes an entire apartment and the subareas 220, 222, 224, 226, 228, 229 are the different rooms of the apartment. In FIG. 2, smart devices are represented by rectangles, connected devices by triangles and locators by circles. Each smart device is associated with a user and, if the smart device is registered to system 100, the smart device may control connected devices, as described herein. In this example, smart devices 130, 132, 134, 136 are registered to system 100 while smart device 138 is not, thus smart device 138 is an unknown smart device. Additionally, a dedicated locator is installed near the entrance to each subarea. For example, locator 122 is installed near entrance 260 of living room 222. Locator 122 may be placed in a location from which locator 122 may supervise entrance 260, so that the pattern of the antenna of locator 122 will cover entrance 260, to detect smart devices that enter or exit entrance 260. Locator 124 may be placed supervising entrance 262, so that its pattern will cover entrance 262, to detect smart devices that enter or exit entrance 262, etc. Each of locators 120, 122, 124, 126, 128, 129 may include a single directional antenna or more than one directional antennas directed at different directions along a walking path that is perpendicular to the entrance it is supervising, so that the locator may help detect the direction of progress of a detected smart device according to the sequence of the RSSI readings received from each antenna. A user carrying smart device 130 walks along route 250 presented by a dashed line, from main entrance 260 to first bedroom 220. For this example, it will be assumed that smart device 130 acts as transmitter and locators 120, 122, 124, 126, 128, 129 act as receivers for the purpose of determining the location of smart device 130. As mentioned before, smart device 130 may act as a receiver and locators 120, 122, 124, 126, 128, 129 may act as transmitters for the purpose of determining the location of smart device 130. Thus, smart device 130 may transmit RF signals continuously or at predetermined intervals, for example, 3 bursts of RF signals per second. Locators 120, 122, 124, 126, 128, 129 may receive these RF signals and calculate RSSI. If the RSSI level detected by locator 122 exceeds a predetermined threshold, it may be determined that a user carrying smart device 130 passes through entrance 260, at about region 252. If the RSSI level is above a predetermined threshold, it may be determined that smart device 130 is currently present in living room 222. If locator 122 includes two or more directional antennas as described hereinabove, each of those antennas may detect a RSSI level above a threshold, and the direction in which smart device 130 progresses may be determined, hence determining if smart device 130 enters or exits living room 222. Locator 122 may communicate with other locators 120, 124, 126, 128, 129 of system 100 and with smart device 130 and back end server 150, if present. For example, locator 122 may communicate with smart device 130 so that smart device 130 and locator 122 would recognize each other. Thus, a predetermined threshold that is customized to smart device 130 and locator 122 may be used for the determination of the passing of smart device 130 through entrance 260. Additionally, other locators 120, 124, 126, 128, 129 may be interrogated to receive their readings of RSSI of smart device 130, to enhance detection and presence determination capabilities, as disclosed herein. It should be readily understood that the determination of the presence of smart device 130 based on readings of locators 120, 121, 122, 124, 126, 128, 129 may be performed by any smart component of system 100 that is configured to communicate with locators 120, 121, 122, 124, 126, 128, 129 and smart device 130. In some embodiments, the determination of the location of smart device 130 may be performed by smart device 130 that may obtain reading from some or all of locators 120, 122, 124, 126, 128, 129. In some embodiments, the determination of the location of smart device 130 may be performed by a locator that detects RSSI readings that are above the threshold and may obtain reading from some or all of other locators 120, 122, 124, 126, 128, 129. In some embodiments, the determination of the location of smart device 130 may be performed by back end server 150, which may obtain readings from some or all of locators 120, 121, 122, 124, 126, 128, 129. If determination of the location of smart device 130 is performed by other component of system 100, smart device 130 may be notified of its location.

Once smart device 130 is informed or determines in which subarea it is present, it may control connected devices according to the control scheme of device 130 associated with that subarea. For example, once it is determined that smart device 130 is present in living room 222, smart device 130 may control connected devices 112, 114, 118 that are associated with living room 222. It should be noted that connected devices associated with living room 222 may be physically located inside living room 222 or outside living room 222. However, since other smart devices 132, 134, 138 are present in living room 222 at the same time smart device 130 is present at living room 222, a conflict resolution mechanism as described herein may be used to determine which of connected devices 112, 114, 118 may be controlled by which of smart devices 132, 134, 138. Smart device 130 may communicate with connected devices 112, 114, 118 to send commands, send user priority rank and presence timer of smart device 130 and get status of connected devices 112, 114, 118, etc. Smart device 130 may communicate with connected devices 112, 114, 118 directly using any applicable short range communication method, or indirectly, for example, via other smart device, via back end server 150, or in any other applicable manner. Smart device 130 may communicate with other smart devices 132, 134 that are registered with system 100 and present in monitored area 210 and notify smart devices 132, 134 of the current location, user priority rank and presence timer of smart device 130, etc. According to some embodiments, smart device 130 may send periodic presence notifications to other smart devices 132, 134 registered with system 100 or to smart devices 132, 134 that are registered with system 100 and present as the same subarea as smart device 130. If smart device 130 is turned off, these messages stop and smart device 130 is considered by the receiving smart devices 132, 134 as absent from the subarea. Thus, if smart device 130 has been master smart device with relation to a connected device and is now turned off, another smart device may become the master smart device.

Later on, when smart device 130 passes to hallway 224, locator 124 may detect a peak in RSSI, that is above the threshold when smart device 130 is at about region 254. The RSSI of the RF signals transmitted by smart device 130 and received by locator 122 at this point may be of low RSSI level relatively to the levels detected previously. Based on the high RSSI readings of locator 124 and the low RSSI readings of locator 122, it may be determined that smart device 130 is now present at hallway. However, since locator 126 is located very near locator 124 and region 254, locator 126 may also detect a peak in RSSI of signals received from smart device 130. According to embodiments of the present invention, it is desirable to set the threshold of locator 126 so that the peak reading of RSSI that is obtained if smart device 130 passes by bathroom 226 without entering bathroom 226 would be below the threshold. However, since that may not always be possible, presence of smart device 130 may alternatively be determined based on logical conclusion drawing. For example, it may be determined that smart device 130 is present in hallway 224 since it was previously present at living room 222. Additionally or alternatively, other logical conclusion drawing and signals processing methods may be used to determine the location of smart device 130 based on readings of more than one locator, for example, locators 122, 124 and 126. Once it is determined that smart device 130 is present in hallway 224, smart device 130 may be no longer authorized to control connected devices 112, 114, 118 that are associated with living room 222, but may instead control connected device 212 associated with hallway 224.

When smart device 130 enters first bedroom 220 locator 120 may detect a level in RSSI that is above the threshold when smart device 130 is at region 256. The RSSI of the RF signals transmitted by smart device 130 and received by locator 124 at this point may be low relatively to the levels detected previously. Based on the high RSSI readings of locator 120 and the low RSSI readings of locator 124, it may be determined that smart device 130 is now present at first bedroom 220. However, since locator 129 of second bedroom 229 is located very near locator 120 and region 256, locator 229 may also detect high RSSI levels of signals received from smart device 130. The location of smart device 130 may be determined using readings of more than one locator as described above. Additionally, presence of smart device 130 may be determined by using a second locator 121 installed in the same subarea as locator 120.

In some situations it may be difficult to determine if RSSI reading above threshold of a locator is related to exiting or entering a subarea or just wandering near the entrance the locator is supervising. According to some embodiments, only RSSI readings above threshold of a locator other than locator 120 (and 121), that supervises another reentrance, may indicate that smart device 130 has left first bedroom 220. One way to resolve this would be to use a locator with more than one antenna to determine the direction of movement of smart device 130 as described hereinabove. Similarly, more than one locator may be used to supervise the entrance to first bedroom 220 and hallway 224. For example, an additional locator 221 may supervise the entrance. It may be determined that smart device 130 has left first bedroom 220 and entered hallway 224, if RSSI readings above threshold of locator 120 is followed by RSSI readings above threshold of locator 221. Using similar logic, it may be determined that if a user is detected by a locator to be present in a specific subarea, the user is not present in other subareas. If the user was present in one of the other subareas before, it may be determined that the user has left that other subarea. For example, RSSI readings above threshold of locator 221, or any other locator except locator 120 (and 121) would indicate that smart device 130 has left first bedroom 220. Each of smart devices 130, 132, 134, 136 that are registered to system 100 may have a user priority rank. In situations where there is a plurality of smart devices present at the same subarea at the same time or in any case when more than one smart device issues control command related to one specific connected device, it may be determined which connected device may be controlled by which smart device, and how, by a conflict resolution mechanism. The conflict resolution mechanism may resolve conflicts based, for example, on the user priority ranks and presence timer of the smart devices. According to some embodiments of the present invention, the user priority ranks and presence timer may be used by a multi user conflict resolution engine executable by a connected device to prioritize between multiple commands of smart devices present in the same monitored area as the connected device. According to some embodiments of the present invention, smart devices that are present in the same subarea may communicate with each other and determine who will gain control and send commands to the connected devices based, for example, on the user priority rank and their presence timer. It should be noted that in some situations, for example, for controlling a connected device that influences a plurality of subareas, the user priority ranks of smart devices that are present in the plurality of respective areas may be taken into account by the conflict resolution mechanism.

In the example presented in FIG. 2, user priority ranks may be used by a multi user conflict resolution engine of a connected device 112 located in living room 222, to prioritize between multiple commands of smart devices 130, 132. For example, connected device 112 may operate according to commands obtained from the smart device with the highest user priority rank. According to some embodiments of the present invention, smart devices 130, 132 that are both present in living room 222 may communicate with each other and determine who will gain control and send commands to connected device 112 based, for example, on the user priority ranks of smart devices 130, 132 and/or their presence timers. For example, smart device 130, that has higher priority rank than smart device 132, may be the only smart device that may send commands to connected device 112. Alternatively, the smart device that is present longer in living room 222 may be the only smart device that may send commands to connected device 112. According to some embodiments both the user priority ranks and the presence timers may be used to prioritize among a plurality of smart devices. For example, priority may be determined according to the user priority ranks as described hereinabove. However, if there are several smart devices with the same user priority rank in living room 222, the smart device that is present longer in the subarea, e.g., the smart device with the highest presence timer may control connected device 112.

According to some embodiments of the present invention, a single smart device, for example, the smart device that has the highest user priority rank, may be the master smart device, however, the master smart device may be pre programmed to define different control schemes for situations where there are other users present with that master smart device in the same subarea at the same time. For example, the master smart device may include a control scheme for times when it is the only smart device present in a subarea and different control scheme for times when there are other smart devices present with it in the same subarea. The control scheme may be different for different other smart devices. Control schemes of smart devices may be affected also by time of day, time of year, other user's presence, etc. According to some embodiments of the present invention, smart devices may each have a plurality of user priority ranks, where each priority rank relates to a specific connected device or a group of connected devices. Thus, it is possible that among several smart devices that are present in the same subarea at the same time, one smart device will have highest priority rank with respect to a certain command to a certain connected device and another smart device will have highest priority with respect to another command to another connected device. In this case the master smart device is defined with relation to a connected device, e.g., a master smart device that has the highest user priority rank for a connected device is the master smart device of that connected device.

For example, in FIG. 2 smart device 130, that has higher priority rank than smart device 132, may be the only smart device that may send commands to connected device 118 or the only smart device that connected device 118 obtains commands from. However, the control scheme of smart device 130 may change if smart device 132 is also present in the same respective area. For example, given that connected device 118 is an air conditioner, smart device 130 may set the temperature to 24° when smart device 130 is the only smart device present in living room 222 and to 22° when smart device 132 is present in living room 222 as well.

The principle of conflict resolution between conflicting preferences of multiple users that are present in the same subarea based on the user priority ranks may be augmented to include more elaborated algorithms. In addition, the conflict resolution algorithm may be device specific. For example, a connected device may be programmed to operate, taking into account preferences of a plurality of users. For example, air conditioner 118 may set the temperature to an average temperature of the multiple users. In some embodiments a connected device may be programmed to operate taking into account preferences of users that have the highest and same user priority rank while ignoring other users that have lower priority ranks.

According to embodiments of the present invention, locators 120, 121, 122, 124, 126, 128, 129 may detect presence of unknown smart device 138. Locators 120, 121, 122, 124, 126, 128, 129 may detect presence of unknown smart device 138 by sensing RF signals that smart device 138 produces anyway. The presence of unknown smart device 138 in monitored area 210 of system 100, and if possible the subarea in which unknown smart device 138 is present, may be reported to smart devices 130, 132, 134 and to connected devices 110, 112, 114, 118, 212 that are registered with system 100 and if applicable to back end server 150. The conflict resolution mechanism of system 100 may consider the presence of unknown smart device 138. Connected devices 110, 112, 114, 118, 212 may change their behavior when an unknown smart device 138 is present. For example, multi user conflict resolution engine of connected devices 110, 112, 114, 118, 212 may take into account the presence of unknown smart device 138. According to some embodiments the presence of smart device 138 inside living room 222 may be detected, and only connected devices 112, 114, 118 that are associated to living room 222 may be influenced. The presence of unknown smart device 138 inside monitored area 210 or inside living room 222 to may be reported to smart devices 130, 132, 134. Smart devices 130, 132, 134 may be pre programmed to define different control schemes for situations where there are unknown smart devices, such as smart device 138, present with them in the same subarea at the same time.

According to some embodiments of the present invention, each of smart devices 130, 132, 134 may control connected devices that are out of their range but in range of other smart devices that are registered to system 100, by sending relevant commands to the smart device that is in range of the connected device. These commands may be sent directly from one smart device to the other, via back end server 150, or in any applicable manner. A smart device that intends to control connected devices that are out of its range but in range of other smart devices may be refereed to herein as a remote smart device.

According to embodiments of the present invention, smart device 130 may know, in real time, the location of all other registered smart devices 132, 134. This may be achieved by an ongoing synchronization process that may be handled by the controller application of smart devices 130, 132, 134. The synchronization process may include, for example, broadcasting, by each smart device 130, 132, 134 to all the other smart devices, directly or via back end server 150, subarea leave and subarea change messages and updating by each smart device 130, 132, 134 its database accordingly. In some embodiments smart device 130 may broadcast presence update request for all the smart devices 132, 134 that are registered with system 100 and present in monitored area 210 to send location updates.

When smart device 130 determined that smart device 130 has changed its location from one subarea to another, it may execute a subarea change process. The subarea change process may handle required database updates of smart device 130, sending commands to relevant connected device, handle communications with other smart devices 132, 134 etc. When smart device 130 leaves a subarea it may execute a subarea leave process. The subarea leave process may handle required database updates of smart device 130, sending commands to relevant connected device, handle communications with other smart devices 132, 134 etc. When a subarea change update is received at smart device 130 from another smart device, a user change process may be executed. The user change process may handle user prioritization based on current presence information and user priority ranks of other smart devices. If user decides to trigger a manual command from the controller application of smart device 130 or a remote command from another smart device is received to be executed by smart device 130, trigger command process may be executed. The trigger command process may handle manual and remote command requests, considering user priorities and presence data. When user priority rank for any of the smart devices registered with system 100 changes, a user priority rank change process may be executed. The user priority rank change process may update other components of system 100, such as other smart devices and back end server 150, with the user priority change. In addition user priority rank change process may check the effect of the user priority change on the multi user conflict resolution engine. When an unknown smart device is sensed, an unknown smart device process may be executed. The unknown smart device process may send relevant connected devices commands related to the unknown smart device.

Below, please find detailed description of exemplary processes that may be form the presence based controller software application according to embodiments of the present invention. It should be noted that presence based controller software application according to embodiments of the present invention, may be implemented using more or other processes.

Subarea change process—subarea change process may be triggered when smart device 130 enters a new subarea, e.g., presence based controller software application determines or is notified by the respective locator that smart device 130 has entered a new subarea. If smart device 130 has also left a subarea, subarea leave process may be activated. When entering a new subarea, the presence timer may be initiated. The presence timer may be used for multi-user conflict resolution and to trigger various activities that may be performed periodically such as user priority evaluation and connected device status inquiries if needed. The current subarea of smart device 130 may be updated in its database. The current subarea of smart device may be sent to other smart devices 132, 134 of system 100 and to back end server 150, if used. The smart device 130 may be notified about other smart devices that may be present in the same subarea and receive user priority ranks of other smart devices that are present in the same subarea, if any. Smart device 130 may compare the user priority rank of smart device 130 with user priority rank of other smart devices that are present in the same subarea, if any. Smart device 130 may determine whether smart device is the master smart device in its subarea based on the comparison. If smart device 130 is the master smart device, smart device 130 may establish connection with connected devices at the subarea, send commands to these connected devices and get status of connected devices.

Subarea leave process—subarea leave process may be triggered when smart device 130 leaves a subarea. The process may be triggered when smart device 130 enters a new subarea, or leaves monitored area 210. When smart device 130 leaves a subarea, it may check whether there are other smart devices that are left in the subarea that smart device 130 leaves. If there are no other smart devices left in the subarea that smart devices 130 leaves, smart device may establish connection and send relevant commands to the connected devices located at the subarea that smart device 130 leaves. For example scheduler database may store commands that should be executed when smart device 130 leaves a subarea. These commends may include, for example, turning lights and air condition off.

Present users change process—present users change process may be triggered when another smart device 132, 134, 138 changes its subarea. Smart device 130 may obtain notification, from the other smart device or from back end server 150, of the new location of the other smart device. The other smart device may enter monitored area 210, leave monitored area 210, or move from one subarea to another within monitored area 210. If the other smart device has left or entered the same subarea as smart device 130, Smart device 130 may compare the user priority rank of smart device 130, smart device 130 may compare again its user priority rank and presence timers with user priority ranks and presence timers of other smart devices that are present in the same subarea, if any, and determine whether smart device 130 is the master smart device in its subarea. If smart device 130 is the master smart device, smart device 130 may establish connection with connected devices at the subarea, send commands to these connected devices and get status of connected devices.

Command process—the command process may be triggered when smart device 130 receives a request to send a command to a connected device that is present in the same subarea of smart device 130. According to some embodiments of the present invention, only the master smart device may send commands to connected devices located in the same subarea as the master smart device. Therefore, if smart device receives a request to send a command to a connected device, smart device 130 may check if it is the master smart device and send the command to the connected device only if smart device 130 is the master smart device. If smart device 130 is not the master smart device, smart device 130 may ignore the request. Smart device 130 may receive the instruction from a remote smart device or from internal scheduler as a manual command. If the instruction is received from a remote smart device and smart device is the master smart device, smart device 130 may compare the user priority rank of the remote smart device with the user priority rank of smart device 130 and may perform the instruction only if the user priority of the remote smart device is higher than the user priority rank of smart device 130.

User priority change process—the User priority change process may be triggered when the user priority rank of smart device 130 is being changed. When the user priority rank of smart device 130 is being changed, smart device 130 may notify other smart devices 132, 134 of system 100, and back end server 150, if used of the new user priority rank. Based on its updated user priority rank, smart device 130 may check if it is the master smart device and send the command to connected devices if smart device 130 is the master smart device.

Unknown smart device process—the unknown smart device process may be triggered when an unknown smart device is detected to be present at the same subarea as smart device 130. In case an unknown smart device is present at the same subarea as smart device 130, and in case smart device 130 is the master smart device, smart device 130 may adjust its commands to the connected devices.

Figure 3:
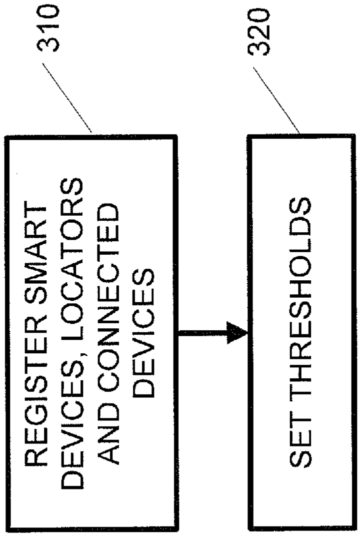
FIG. 3 is a flowchart illustration of a method for setup of presence based system according to embodiments of the present invention.

Reference is now made to FIG. 3 which is a flowchart illustration of a method for setup of presence based system according to embodiments of the present invention. According to embodiments of the present invention, the method may be used to set up systems such as system 100.

In operation 310, various components such as locators, smart devices and connected devices of system 100 may be registered. Additionally, data related to each component may be entered, for example, the subareas related to each locator and connected device, user priority ranks of smart devices, etc. If system 100 includes back end server 150, this may be done via back end server 150, and distributed to each component. Alternatively, each component may be configured separately. Operation 310 may include building and updating required fields and databases of the various components. For example, user IDs may be given, device databases at the smart devices may be created, etc.

In operation 320 thresholds that are later used to determine passing of a smart device through entrances to subareas are set. These thresholds may be, but are not necessarily, customized for every pair of a locator and a smart device. Customizing the threshold for every pair of a locator and a smart device may adjust the threshold to the specific RF characteristics of the smart device-locator pair in a specific installation, and may reduce chances for false presence detection. The threshold may be set manually or automatically in any applicable manner. For example, system 100 may enter a "learning phase" in which a smart device of system 100 may travel along a certain path and RSSI readings are collected for the purpose of determining the thresholds. In some embodiments a user may give indication to system 100, for example, via a user interface of the smart device, each time the user enters a different subarea, and these indications may be paired with the RSSI readings to help set the thresholds.

Figure 4:
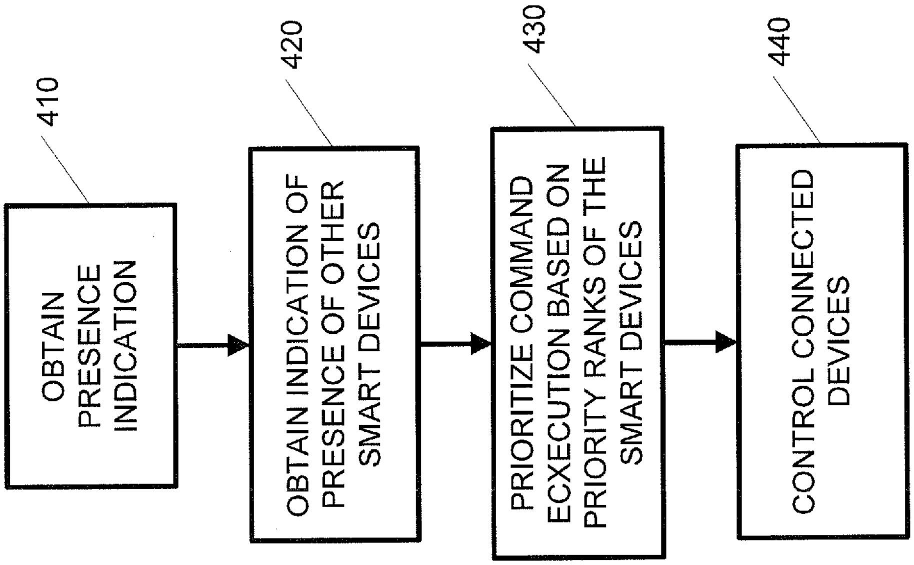
FIG. 4 is a flowchart illustration of a method for controlling a plurality of connected devices according to embodiments of the present invention.

Reference is now made to FIG. 4 which is a flowchart illustration of a method for controlling a plurality of connected devices according to embodiments of the present invention. According to embodiments of the present invention, this method may be performed by a presence based system such as system 100.

In operation 410 indication of presence of a smart device in a subarea is obtained. The presence of the smart device in a subarea may be determined based on RF signals exchanged between the smart device and a locator or a plurality of locators, as described herein. In operation 420 indication of presence of other smart devices in the same or in other respective areas is obtained. The other smart devices may be registered or unknown. In operation 430 command executions may be prioritized, for example, based on user priority ranks of the smart devices that are present in the same subarea at the same time, as disclosed herein. In operation 440 connected devices may obtain commands from smart devices.

Due to the nature of RF signals, care must be taken for positioning of locators, such as locators 120, 122, 124, 126, 128, 129, 221 in correct locations with relation to the entrance the locator is supervising. The locators should be positioned so as to ensure that the transmit/receive pattern, or the beam of the antenna would substantially cover the supervised entrance. An entrance is considered supervised if the entrance is covered by the beam of the antenna. The entrance is considered covered by the beam of the antenna if the gain of the antenna is significantly higher at or near the entrance at the side of the entrance facing the associated subarea than in other areas. For example, the entrance may be considered covered if the gain of the antenna in the plane of the entrance, or in a plane that is in close proximity to and substantially parallel to the supervised entrance and internal to the subarea associated with the locator is substantially higher than in locations distal from the entrance inside the subarea or close to the entrance on the outer side of the entrance. This may be achieved, for example, by installing the antenna on or near the ceiling of the subarea, substantially against the center of the entrance and slightly distal from the plane of the entrance and directing the central axis of the antenna substantially downwards. According to another embodiment the antenna may be installed on or near the ceiling of the sub-area, substantially against the center of the entrance and very close to the plane of the entrance inside the subarea and directing central axis of its beam at an angle θ (theta) away from the plane of the entrance into the subarea. If the gain of the antenna is significantly higher at or near the entrance than in other areas, RF transmission from the locator is receivable in close proximity to the supervised entrance and a receiver of the RF transmission will experience noticeable rise of the RSSI of the received RF transmission when passing through the entrance. Similarly, if the gain of the antenna of the locator is significantly higher at or near entrance than in other areas, the locator may experience noticeable rise of the RSSI of received RF transmissions from a smart device when the smart device is passing through the entrance. The antenna may have vertical or horizontal polarization, with vertical and horizontal beam width preferably below 45 degrees. For example, the vertical and horizontal beam width may be about 30 degrees. Beam width may relate to the angle between the points of a main lobe of the antenna at which the intensity of the effective radiated power drops by 3 dB with relation to the maximum effective radiated power of the main lobe of the antenna.

Figure 5B:
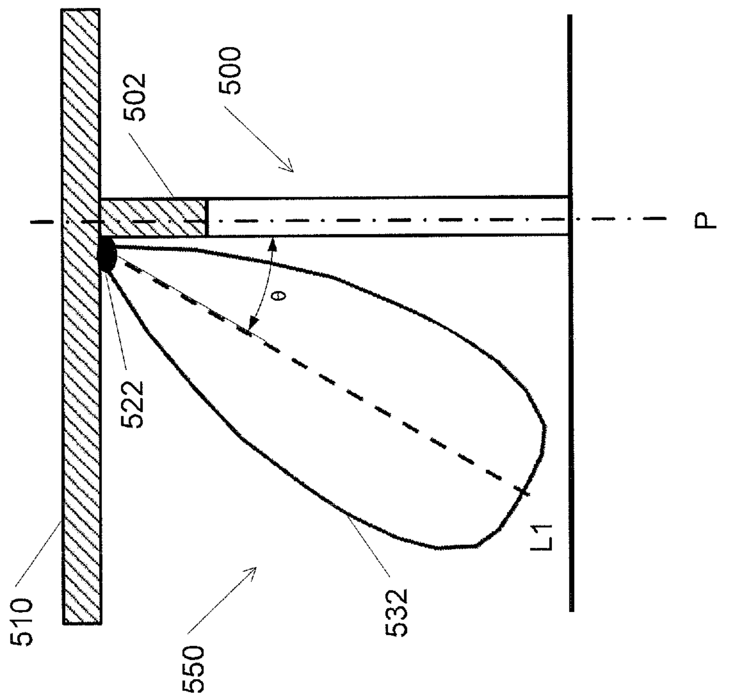
FIG. 5B depicts another locator installed supervising an entrance of a subarea according to some embodiments of the present invention.
Figure 5A:
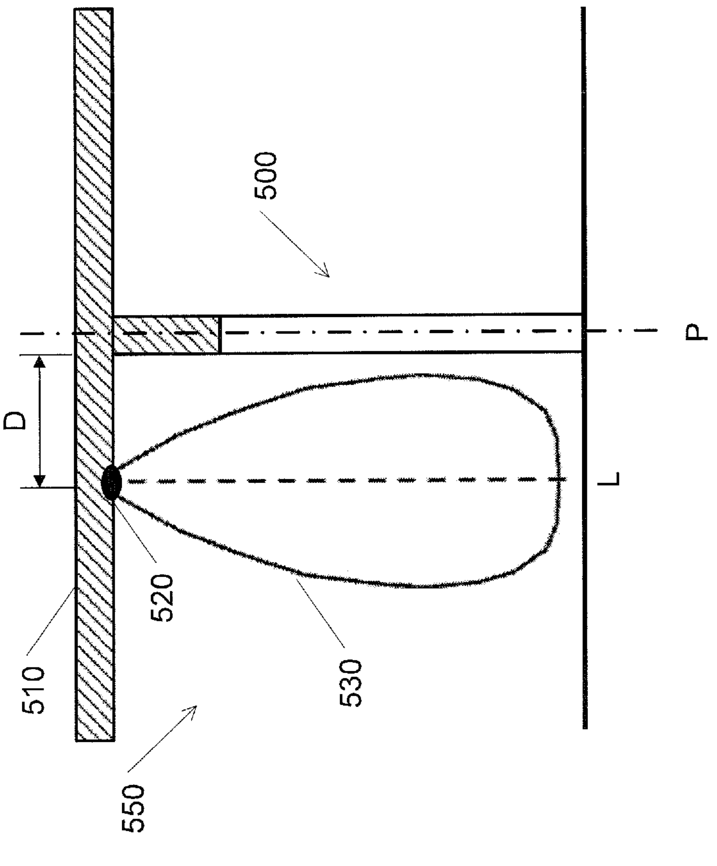
FIG. 5A depicts a locator installed on a ceiling supervising an entrance of a subarea according to some embodiments of the present invention.

Reference is now made to FIG. 5A which depicts a locator 520 installed on a ceiling 510 supervising entrance 500 of a subarea 550 according to some embodiments of the present invention. According to some embodiments of the present invention, locator 520 may be installed on ceiling 510 of subarea 550, at a distance D, which is typically up to 1.5 m, inwards from entrance 500 into subarea 550, so that beam or pattern 530 of the antenna of locator 520 may cover entrance 500 to the subarea 520. Locator 520 may be installed substantially against the center of entrance 500 and the central axis L of the beam of the antenna of locator 520 may be directed substantially downwards. Beam 530 covers a plane that is parallel to the plane of entrance 500 in a way that when a smart device passes through entrance 500 a noticeable change in RSSI of received RF transmission is sensed by the receiver, which may be either the locator or the smart device.

Reference is now made to FIG. 5B which depicts a locator 522 installed supervising entrance 500 of a subarea 550 according to some embodiments of the present invention. According to some embodiments of the present invention, locator 522 may be installed inside subarea 550 on ceiling 510 of subarea 550, adjacent to entrance 500 of subarea 550, or on lintel 502 of the doorway of entrance 500 and substantially against the center of entrance 500. The central axis of beam 532 of the antenna of locator 522 is directed at an angle θ (theta) with respect to the plane of entrance 500 and is aimed inwards subarea 550, so that beam or pattern 532 of the antenna of locator 522 may cover entrance 500 to the subarea 520. θ (theta) may in the range of half of the beam width and up to 22.5 degrees, and may be adjustable to ensure adequate coverage of specific geometries of entrances by specific antennas. Beam 532 is angled in an angle θ (theta) with respect to the plane of entrance 500 in a way that when a smart device passes through entrance 500 a noticeable change in RSSI of received RF transmission is sensed by the receiver, which may be either the locator or the smart device. Axis L1 represents the center of beam 532.

According to some embodiments of the present invention, more than one locator, or a locator with more than one antenna may be installed supervising a single entrance. Reference is now made to FIG. 5C which depicts two locators 520, 560 installed on a ceiling 510 of two adjacent subareas 550, 552 in two opposite sides of entrance 500, according to some embodiments of the present invention. Locators 520, 560 may be installed substantially against the center of entrance 500 and the central axes L, L2 of the beams of the antenna of locators 520, 560 may be directed substantially downwards. According to embodiments of the present invention, two locators 520, 560 may help determining the direction of movement of a smart device passing through entrance 500 giving more detailed information regarding the location of the smart device. A reading above threshold in locator 520 followed by a reading above threshold in locator 560 may indicate that the smart device exited subarea 550 and entered subarea 552, and a reading above threshold in locator 560 followed by a reading above threshold in locator 520 may indicate that the smart device exited subarea 552 and entered subarea 550. Each of locators 520, 560 may be installed on ceiling 510 with its beam parallel to entrance 500, as explained with reference to FIG. 5A.

Figure 5D:
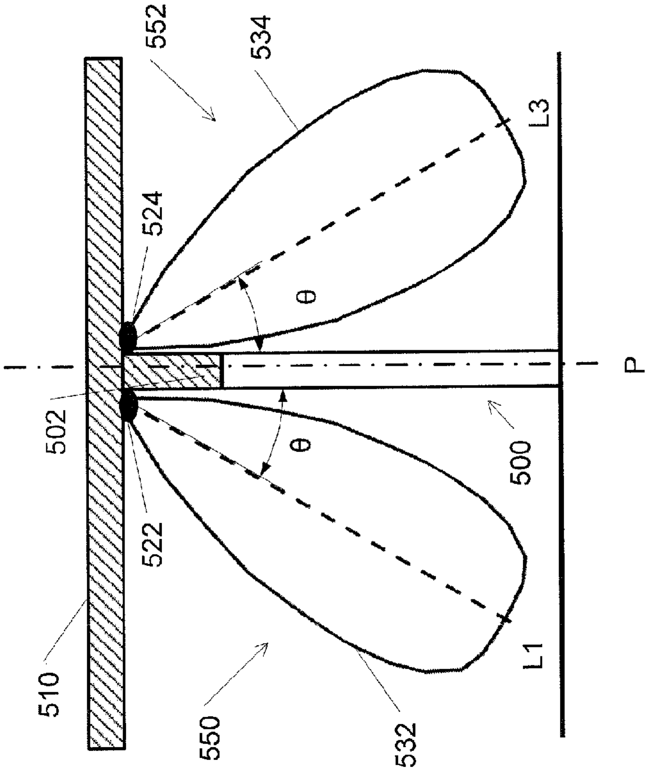
FIG. 5D depicts two locators installed in two opposite sides of entrance according to some embodiments of the present invention.
Figure 5C:
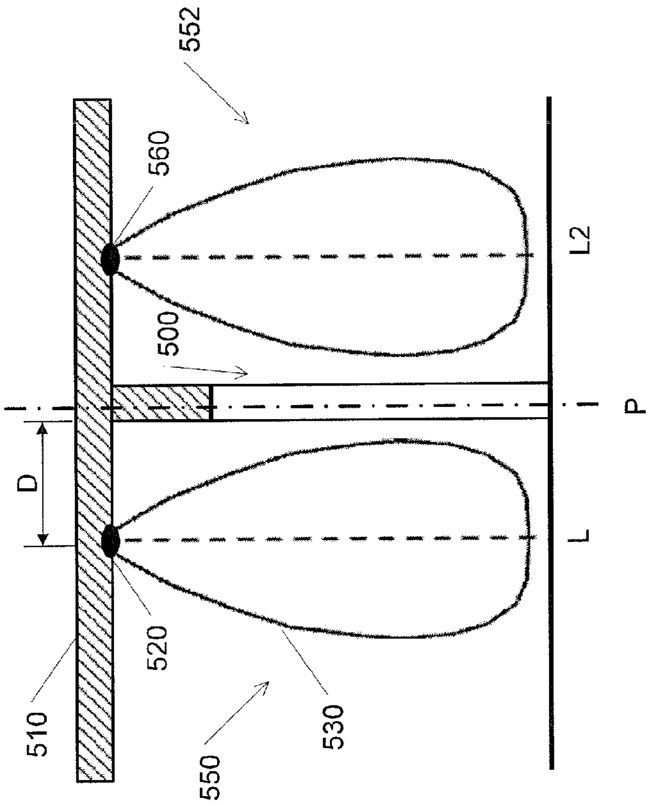
FIG. 5C depicts two locators installed on a ceiling of two adjacent subareas in two opposite sides of entrance, according to some embodiments of the present invention.

Reference is now made to FIG. 5D which depicts two locators 522, 524 installed in two opposite sides of entrance 500 according to some embodiments of the present invention. Locators 522, 524 may be installed on ceiling 510 at two opposite sides of entrance 500, adjacent to entrance 500, or on lintel 502 of the doorway of entrance 500. Central axis L1 of Beam 532 of the antenna of locator 522 is directed at an angle θ (theta) with respect to the plane of entrance 500 and is aimed inwards subarea 550, and Central axis L3 of beam 534 of the antenna of locator 524 is directed at an angle θ (theta) with respect to the plane of entrance 500 and is aimed inwards subarea 552. Again, reading above threshold in locator 522 followed by a reading above threshold in locator 524 may indicate that the smart device exited subarea 550 and entered subarea 552, and a reading above threshold in locator 524 followed by a reading above threshold in locator 522 may indicate that the smart device exited subarea 552 and entered subarea 550.

According to embodiments of the present invention, presence of smart devices is detected by exchanging RF signals between the locators and the smart devices. No need for second communication technology such as Infra-Red, as used by current solutions that offer the similar accuracy. This is achieved by concentrating on the entrance of each subarea, and not on the subarea itself. When trying to determine the location of a smart device based on RF signals alone, the achieved accuracy is about 1-2 meters. Since RF signals penetrate walls this may not be enough for determining the presence of a smart device within a subarea of a building, which, for the purposes of the present invention, may be a room of sizes of about 10 square meters. Thus current solutions use RF for rough estimation of the location of the device, and a second and more accurate technology such as Infra-Red, for more precise location estimation. Embodiments of the present invention provide accurate enough location estimation, e.g., estimation of the subarea in with the smart device is present, without knowing where inside the subarea the smart device is present which is redundant for the current application, using only RF technology. The RF technology used by embodiments of the present application for location detection is normally embedded in currently used smart devices and protocols that are currently implemented in smart devices, such as Bluetooth low energy (BLE) and Wi-Fi, may be used for the determination of presence of the smart device.

Some embodiments of the present invention may be implemented in software for execution by a processor-based system, for example, presence based application. For example, embodiments of the present invention may be implemented in code or software and may be stored on a non-transitory storage medium having stored thereon instructions which, when executed by a processor, cause the processor to perform methods as discussed herein, and can be used to program a system to perform the instructions. The non-transitory storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices. Other implementations of embodiments of the present invention may comprise dedicated, custom, custom made or off the shelf hardware, firmware or a combination thereof.

Embodiments of the present invention may be realized by a system that may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A presence based system comprising:

a smart device configured to operate at least one connected device;

a locator comprises a directional antenna, wherein the locator is associated with a specific entrance to a subarea of a monitored area and configured to supervise an entrance to the subarea of a monitored area via said specific entrance, wherein the directional antenna having a beam width of less than 45 degrees and positioned such that a gain of the antenna in an area near the entrance at the side of the entrance facing said subarea is higher than the gain of the antenna close to the entrance at the outer side of the entrance, and that the gain of the antenna in the area near the entrance at the side of the entrance facing said subarea is higher than the gain of the antenna in locations distal from the entrance inside the subarea of a monitored area, wherein the smart device and the locator are configured to exchange, by the directional antenna, radio frequency (RF) signals to determine presence and location of the smart device within the subarea based on received RF signals and are further configured to determine the presence and location of the smart device within the subarea by detecting passing of the smart device through said area near said entrance at the side of the entrance facing said subarea; and wherein the smart device is configured to issue control commands to operate the at least one connected device based on a predefined scheme and on the presence of the smart device within the subarea.

2. The presence based system of claim 1, wherein the antenna is installed near a ceiling of the subarea substantially against the center of the entrance and distal from the plane of the entrance at the side of the entrance facing said subarea;

and wherein the central axis of the antenna is directed substantially downward.

3. The presence based system of claim 1, wherein the smart device and the locator are configured to detect the passing of the smart device through said area near said entrance at the side of the entrance facing said subarea based on received signal strength indicator (RSSI) of the received RF signals.

4. The presence based system of claim 3, wherein the smart device and the locator are configured to detect the passing of the smart device through the area near said entrance at the side of the entrance facing said subarea if the RSSI of the received RF signals is above a predefined threshold.

5. The presence based system of claim 4, wherein the predefined threshold is customized to the smart device and the locator.

6. The presence based system of claim 4, wherein the RF signals are transmitted by the smart device and received by the locator.

7. The presence based system of claim 4, wherein the RF signals are transmitted by the locator and received by the smart device.

8. The presence based system of claim 1, wherein the smart device is configured to determine the presence of the smart device within the subarea based on the received RF signals.

9. The presence based system of claim 1, wherein the locator is configured to determine the presence of the smart device within the subarea based on the received RF signals, and wherein the locator is configured to inform the smart device of the presence of the smart device within the subarea.

10. The presence based system of claim 2, further comprising an additional locator associated with the specific entrance to the subarea of the monitored area, the additional locator configured to supervise the entrance, and wherein the directional antenna of the additional locator is installed near the ceiling at the side of said entrance opposite to said subarea substantially against the center of the entrance;

wherein the central axis of the beam of the antenna of the additional locator is directed substantially downward, and wherein the smart device and the locators are configured to determine the presence and location of the smart device within the subarea by distinguishing between entrance into and exit from the subarea of the smart device based on the sequence of RSSI of RF signals exchanged between each of the locators and the smart device.

11. The presence based system of claim 1, further comprising at least one additional smart device as claimed in claim 1, wherein each of the smart devices has a user priority rank associated to it, and wherein each of the smart devices is configured to determine presence of the other smart device in the subarea and the priority rank associated with the other smart device and to control the at least one controlled device based on the presence and the user priority ranks of the smart device and the determined presence and priority rank of the at least one additional smart device.

12. The presence based system of claim 1, wherein the smart device is configured to control the at least one connected device using direct wireless communication between the smart device and the at least one connected device.

13. The presence based system of claim 1, comprising a transparent wireless bridge device to connect between the smart device and the at least one connected device, wherein the smart device is configured to control the at least one connected device through the transparent wireless bridge device.

14. A smart device configured to control at least one connected device, wherein the smart device is configured to determine presence and location of the smart device in a subarea of a monitored area by detecting passing of the smart device through an entrance to said subarea using a locator, wherein said locator comprises a directional antenna having a beam width of less than 45 degrees, wherein the locator is associated with a specific entrance to the subarea and configured to supervise the entrance to the subarea via said specific entrance, wherein the directional antenna positioned such that a gain of the antenna in the area near the entrance, at the side of the entrance facing said subarea, is higher than the gain of the antenna close to the entrance at the outer side of the entrance and that the gain of the antenna in the area near the entrance, at the side of the entrance facing said subarea, is higher than the gain of the antenna in locations distal from the entrance inside the subarea of a monitored area, wherein the presence is determined based on strength of received RF signals exchanged between the smart device and the locator, by the directional antenna, and wherein the smart device is configured to control the at least one connected device based on the presence of the smart device within the subarea and on a predefined scheme stored in the smart device.

15. The smart device of claim 14, wherein the smart device is configured to produce the RF signals, and wherein the locator is configured to receive the RF signals and to detect passing of the smart device through said entrance to said subarea if the RSSI of the received RF signals is above a predefined threshold and wherein the smart device is further configured to determine the presence and location of the smart device within the subarea based on received indications from the locator of passing of the smart device through the entrance.

16. The smart device of claim 14, wherein the antenna is installed near a ceiling of the subarea substantially against the center of the entrance and distal from the plane of the entrance at the side of the entrance facing said subarea, and wherein the central axis of the antenna is directed substantially downward.

17. The smart device of claim 14, wherein the smart device is configured to receive the RF signals from the locator and to determine the passing of the smart device through the entrance, based on the received RF signals.

18. The smart device of claim 17, wherein the passing of the smart device through the entrance is determined if RSSI of the received RF signals is above a predefined threshold.

19. The smart device of claim 15, wherein the predefined threshold is customized to the smart device and the locator.

20. The smart device of claim 14, wherein the smart device has a user priority rank, wherein the smart device is configured to obtain indications of presence of other smart devices in the same subarea, and to obtain user priority ranks associated with the other smart devices, and wherein the smart device is configured to control the at least one connected device based on the presence and user priority rank of the smart device and on an obtained indications of a presence of the other smart devices and the user priority ranks associated with the other smart devices.

21. The smart device of claim 14, wherein the smart device comprises an antenna usable for at least one of data and voice communication, wherein the antenna is used also for the exchanging of RF signals between the smart device and the locator.

22. The smart device of claim 14, wherein the smart device is configured to control the at least one connected device using direct wireless communication between the smart device and the at least one connected device.

23. A method for controlling at least one connected device by a smart device, the method comprising:

determining, by the smart device and a locator, presence and location of the smart device in a subarea of a monitored area by detecting passing of the smart device through an entrance to said subarea, wherein said locator is associated with said specific entrance to the subarea and configured to supervise the entrance to the subarea via said specific entrance, said locator comprises a directional antenna having a beam width of less than 45 degrees, positioning the directional antenna such that a gain of the antenna in an area near the entrance, at the side of the entrance facing said subarea, is higher than the gain of the antenna close to the entrance at the outer side of the entrance and that the gain of the antenna in the area near the entrance, at the side of the entrance facing said subarea, is higher than the gain of the antenna in locations distal from the entrance inside the subarea of a monitored area and wherein the presence and location are determined, by the smart device, based on strength of RF signals exchanged between the smart device and the locator by the directional antenna, and; and controlling the at least one connected device by the smart device based on a predefined scheme stored in the smart device and on the presence of the smart device within the subarea.

24. The method of claim 23, wherein the antenna is installed near a ceiling of the subarea substantially against the center of the entrance and distal from the plane of the entrance at the side of the entrance facing said subarea and wherein the central axis of the antenna is directed substantially downward.

25. The method of claim 23, wherein passing of the smart device to the subarea is detected if RSSI of the RF signals is above a predetermined threshold.

26. The method of claim 23, comprising:

producing the RF signals by the smart device;

receiving the RF signals by the locator;

detecting passing of the smart device through the entrance to the subarea by the locator if RSSI of the received RF signals is above a predetermined threshold;

customizing the predetermined threshold to the smart device and the locator by the locator.

27. The method of claim 23, comprising:

producing the RF signals by the smart device;

receiving the RF signals by the locator;

detecting passing of the smart device through the entrance to the subarea by the locator based on the received RF signals; and receiving at the smart device, indications from the locator of detecting the passing of the smart device through the entrance of the subarea associated with the locator.

28. The method of claim 23, comprising:

producing the RF signals by the locator;

receiving at the smart device RF signals produced by the locator; and determining the passing of the smart device through the entrance if RSSI of the received RF signals is above a predetermined threshold.

29. The method of claim 23, comprising:

assigning a user priority rank to the smart device and to an at least one additional smart device;

receiving at the smart device indications of presence of other smart devices in the same subarea and the priority rank of each of the other smart devices; and controlling the at least one connected device based on the user priority rank of the smart device and on the user priority ranks of the other smart devices.

30. A locator comprises a directional antenna having a beam width is less than 45 degrees, wherein the locator is associated with a specific entrance to a subarea of a monitored area and configured to supervise the entrance of a smart device to the subarea via said specific entrance and to determine the presence and location of the smart device within the subarea by detecting passing of the smart device through an area near said entrance at the side of the entrance facing said subarea based on received radio frequency (RF) signals transmitted by the smart device, wherein the locator is configured to inform the smart device of the presence and location of the smart device within the subarea, and wherein the directional antenna is positioned such that a gain of the antenna in the area near the entrance, at the side of the entrance facing said subarea, is higher than the gain of the antenna close to the entrance at the outer side of the entrance and that the gain of the antenna in the area near the entrance, at the side of the entrance facing said subarea, is higher than the gain of the antenna in locations distal from the entrance inside the subarea of a monitored area.

31. The locator of claim 30, wherein the antenna is installed near a ceiling of the subarea substantially against the center of the entrance and slightly distal from the plane of the entrance at the side of the entrance facing said subarea; and wherein the central axis of the antenna is directed substantially downward.

32. The locator of claim 30 further configured to detect the passing of the smart device through said area near said entrance at the side of the entrance facing said subarea based on received signal strength indicator (RSSI) of the received RF signals.

33. The locator of claim 32 further configured to detect the passing of the smart device through said area near said entrance at the side of the entrance facing said subarea if the RSSI of the received RF signals is above a predefined threshold.

34. The locator of claim 33 wherein the predefined threshold is customized to the smart device.

35. The presence based system of claim 1, wherein the smart device is configured to determine that the smart device has left the subarea by detecting passing of the smart device by another locator while entering another subarea.

36. The presence based system of claim 11, wherein the priority rank is based additionally on the duration of time the smart device is present in the subarea.

37. The smart device of claim 14, wherein the smart device is configured to determine that the smart device has left the subarea by detecting passing of the smart device by another locator while entering another subarea.

38. The smart device of claim 20, wherein the priority rank is based additionally on the duration of time the smart device is present in the subarea.

39. The method of claim 23, further comprising determining, by the smart device, that the smart device has left the subarea by detecting passing of the smart device by another locator while entering another subarea.

40. The method of claim 29, wherein the priority rank is based additionally on the duration of time the smart device is present in the subarea.

41. The locator of claim 30 wherein the smart device is configured to determine that the smart device has left the subarea by detecting passing of the smart device by another locator while entering another subarea.

42. The presence based system of claim 3, wherein the smart device and the locator are configured to detect the passing of the smart device through said area near said entrance at the side of the entrance facing said subarea based on noticeable rise of RSSI of the received RF transmission when the smart device passes through said area near said entrance at the side of the entrance facing said subarea.

43. The presence based system of claim 3, wherein the antenna of the locator is installed near the ceiling inside the subarea adjacent to said entrance to the subarea and substantially against the center of the entrance and wherein the central axis of the antenna is directed at an angle that with respect to the plane of the entrance aiming into the subarea, at a maximum of 22.5 degrees.

44. The locator of claim 32, wherein the locator is further configured to detect the passing of the smart device through said area near said entrance at the side of the entrance facing said subarea based on noticeable rise of RSSI of the received RF transmission when the smart device passes through said area near said entrance at the side of the entrance facing said subarea.

45. The locator of claim 31, wherein the antenna of the locator is installed near the ceiling inside the subarea adjacent to said entrance to the subarea and substantially against the center of the entrance; and wherein the central axis of a beam of the antenna is directed at an angle that with respect to the plane of the entrance aiming into the subarea, at a maximum of 22.5 degrees.

* * * * *